United States Patent [19]

Shibata et al.

[11] Patent Number: 4,704,326
[45] Date of Patent: Nov. 3, 1987

[54] TIN ALLOYS FOR RECORDING MEDIA

[75] Inventors: Yasuo Shibata, Sagamihara; Hideaki Takehara; Shin Miyajima, both of Fujisawa, all of Japan

[73] Assignee: Victor Company of Japan Limited, Yokohama, Japan

[21] Appl. No.: 822,037

[22] Filed: Jan. 24, 1986

[30] Foreign Application Priority Data

Feb. 5, 1985 [JP] Japan .................................. 60-20274
Feb. 28, 1985 [JP] Japan .................................. 60-39694

[51] Int. Cl.⁴ ........................ B32B 15/04; G01D 9/00
[52] U.S. Cl. .................................. 428/336; 346/76 L; 346/135.1; 346/137; 428/457; 428/913; 430/945
[58] Field of Search .................. 430/945; 428/40, 336, 428/334, 913, 457; 346/76 L, 135.1, 137

[56] References Cited

U.S. PATENT DOCUMENTS 4,312,688  1/1982  Brodis et al. ...................... 428/40 X
4,564,589  1/1986  Hallman et al. ................. 430/945 X
4,565,772  1/1986  Takeoka et al. ................. 430/945 X
4,581,317  4/1986  Simmons III .................... 430/945 X

OTHER PUBLICATIONS

Electronics, "Mass Storage", Jun. 24, 1985, pp. 67-69.
Abstract of Japanese Pat. No. 83-208094 to Takita.

Primary Examiner—Thomas J. Herbert
Attorney, Agent, or Firm—Roberts, Spiecens & Cohen

[57] ABSTRACT

A tin-lead alloy for recording media, which consists essentially of from 30 to 70% by weight of tin and the rest being lead.

20 Claims, 7 Drawing Figures

FIGURE 1
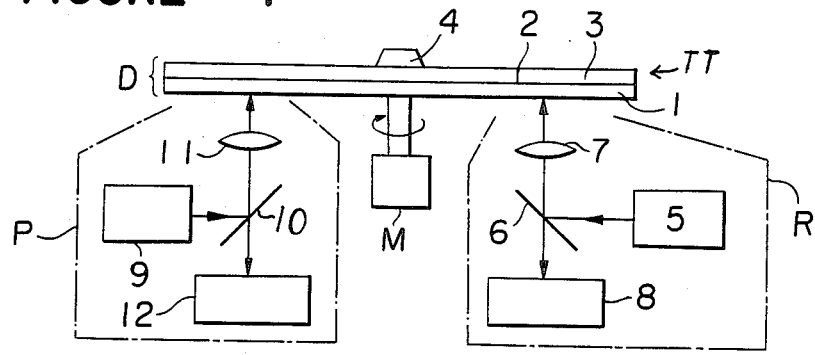
FIGURE 2
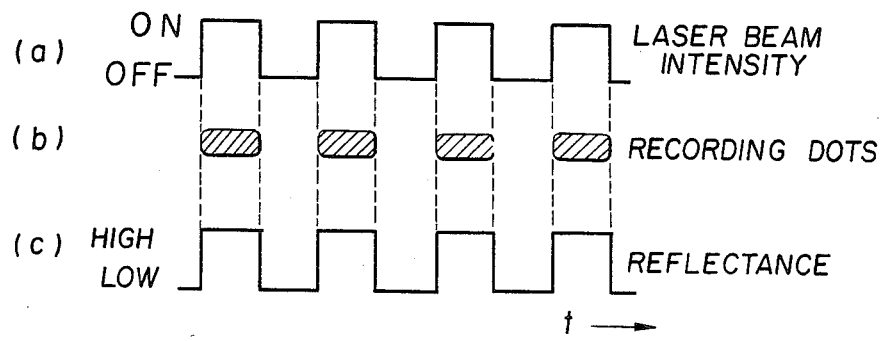
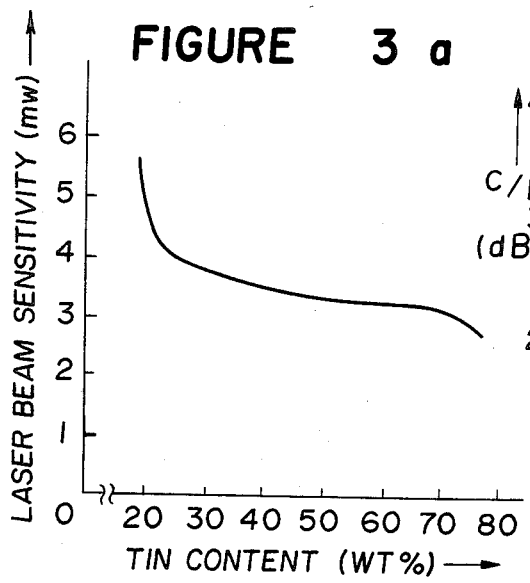
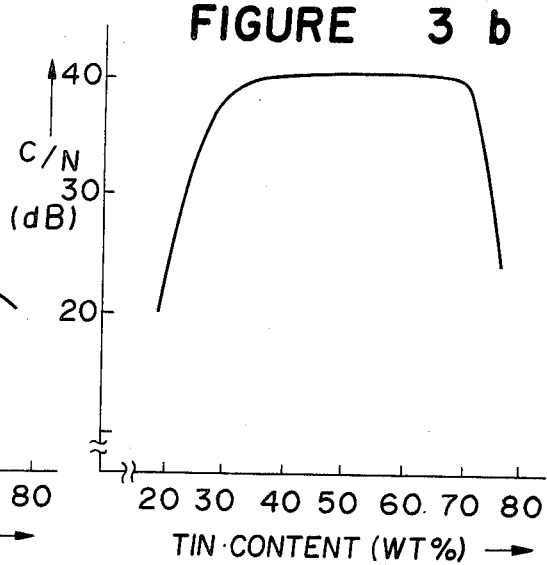

TIN ALLOYS FOR RECORDING MEDIA

BACKGROUND OF THE INVENTION

1. Field of the Invention

The present invention relates to tin alloys for recording media. More particularly, it relates to a tin-lead alloy and a tin-copper alloy for recording media.

2. Description of the Prior Art

In recent years, there have been active research and development activities for high density large capacity information recording medium discs useful for a high speed random access system. In particular, research is being made for novel recording media which are capable of recording and reproducing information by irradiation of laser beam spots and which are provided with a suitable auxiliary means whereby recorded information can be erased and rewritten with new information.

Various recording media so far proposed for the recording and reproduction of information by means of laser beams, may generally be classified into such categories as a pit-forming type, a bubble-forming type, a magneto-optical type, and a phase transformation type (i.e. a thermal transformation type wherein the transmission, reflection, absorption, etc. of light is changed by the thermal energy) based on the type of a physical change caused to the recording medium by the thermal action of the spots of laser beams to record information.

Among such various types of recording media, those belonging to the phase transformation type are considered to be of particular interest for the possibility that the recorded information can be erased. As the recording media of this type, there have been proposed recording media wherein a thin layer of a composition of a variety of combination of germanium, tellurium, antimony, silicon, arsenic, bismuth, indium, gallium, thallium, selenium and sulfur, or a thin layer of a lower oxide (such as a mixture of Te and $TeO_2$) is employed. However, in such conventional recording media wherein a thin layer of a composition of various combinations of chalcogenide substances or a thin layer of a lower oxide (such as a mixture of Te and $TeO_2$) is used, the optimum beam intensity (i.e. a laser beam intensity sufficient to cause the phase transformation to the recording medium, whereby the secondary harmonic distortion in the reproduced signal from the portion of the recording medium irradiated with the laser beams of that intensity, is minimized) and/or the signal to noise ratio (S/N) varies considerably depending on the proportional ranges of the substances constituting the thin layer of the recording medium. Therefore, such conventional recording media had difficulty in that mass production of recording media having predetermined properties was not readily feasible.

SUMMARY OF THE INVENTION

In the first aspect, the present invention provides a tin-lead alloy for recording media, which consists essentially of from 30 to 70% by weight of the tin and the rest being lead.

In the second aspect, the present invention provides a tin-copper alloy for recording media, which consists essentially of from 40 to 60 atomic % of tin and the rest being copper.

Further, the present invention provides recording media comprising a substrate and a recording layer formed on the substrate, wherein the recording layer is composed essentially of the tin-lead alloy or the tin-copper alloy, as defined above.

BRIEF DESCRIPTION OF THE DRAWINGS

FIG. 1 is a block diagram showing the construction of a recording and reproduction apparatus used for the recording and reproduction tests of the recording media.

FIG. 2 is a diagram showing the relation among the state of the intermittent irradiation of a laser beam on the tin-lead alloy thin layer for a recording medium, the state of the recording dots of the tin-lead alloy thin layer and the state of the change in the reflection of light.

FIG. 3(a) is a graph showing the relation between the tin content in the tin-lead alloy thin layer and the laser beam sensitivity.

FIG. 3(b) is a graph showing the relation between the tin content in the tin-lead alloy thin layer and the C/N ratio during the reproduction.

DETAILED DESCRIPTION OF THE PREFERRED EMBODIMENTS

Figure 4:
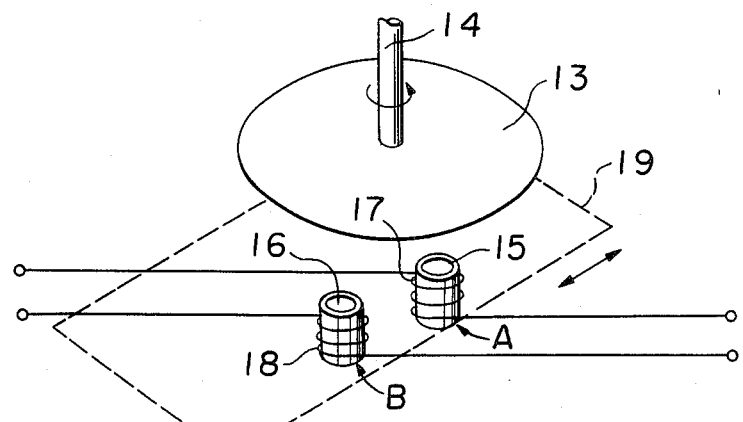
FIG. 4 is a perspective view showing the construction of a recording layer-forming apparatus.

Firstly, the tin-lead alloy for recording media according to the first aspect of the invention will be described.

The tin-lead alloy for recording media of the present invention has been developed on the basis of the discovery during research on the recording materials suitable for recording media of phase transformation type (i.e. the thermal transformation type wherein the light transmission, reflection, absorption or the like is changed by the thermal energy) that a tin-lead alloy having a composition comprising from 30 to 70% by weight of tin and the rest being lead, has characteristics particularly suitable for recording media of phase transformation type.

Now, the tin-lead alloy for recording media of the present invention will be described in detail with reference to the accompanying drawings. The tin-lead alloy for recording media of the present invention which is composed of a two component alloy comprising tin and lead, can readily be formed as a thin layer having a thickness of from 500 to 1000 Å, e.g. about 1000 Å, by a suitable method such as vacuum vapor deposition, sputtering or the like. As an example, there will be described a case wherein the tin-lead alloy for recording media of the present invention, i.e. the tin-lead alloy for recording media consisting essentially of from 30 to 70% of tin and the rest being lead, is formed as a thin layer of a predetermined thickness on various substrates by simultaneous independent sputtering of the two components.

Firstly, a substrate made of a suitable material (such as glass or plastic material) is attached to a substrate holder rotatably installed in a vacuum chamber, and then the vacuum chamber is evacuated to a vacuum level of about $10^{-6}$ Torr. Then, while supplying argon gas (the argon gas pressure being from $1.0 \times 10^{-3}$ to $5 \times 10^{-3}$ Torr), argon ions are bombarded on the two independent targets i.e. the tin target and the lead target, to induce sputtering, whereby a thin layer of a tin-lead alloy having a predetermined composition and a predetermined thickness is formed on the substrate which is rotated at a suitable rotational speed.

The composition of the tin-lead alloy thin layer formed on the substrate can be adjusted by controlling the energy imparted to the argon ions which are bombarded on the two independent targets. The adjustment of the energy can readily be made by changing the electric power applied to the two independent targets. Likewise, the thickness of the tin-lead alloy thin layer for recording medium to be formed on the surface of the substrate can readily be adjusted to a predetermined thickness by adjusting the sputtering period of time.

Thus, a recording medium comprising a substrate and a recording layer formed on the surface of the substrate and composed essentially of a tin-lead alloy thin layer for recording media consisting essentially of from 30 to 70% by weight of tin and the rest being lead, can readily be prepared as described above.

When it is necessary to form a protective layer on the surface of the recording layer thus formed on the surface of the substrate, a protective layer made of a suitable synthetic resin thin film may be coated on the surface of the recording layer by an application of an optional conventional method.

Further, for the formation of the recording layer by sputtering, it is also possible to conduct the layer-forming process by using a single target of a tin-lead alloy having a composition properly adjusted taking the sputtering rates of tin and lead into account.

FIG. 1 is a block diagram showing the construction of a recording and reproduction apparatus used for the tests wherein the recording and reproduction of signals are conducted by irradiating a laser beam spot on the recording medium comprising a recording layer of a tin-lead alloy for recording media formed on a substrate as mentioned above. In FIG. 1, M designates a motor, and TT designates a turntable. A recording medium D is secured to the turntable TT by a fastening means 4 (clamper 4).

The recording medium D comprises a transparent plastic substrate 1 and a recording layer 2 of the tin-lead alloy formed on the substrate. Further, in the illustrated embodiment, a protective layer 3 is formed on the recording layer 2.

Block R designates a recording system, whereas block P designates a reproduction system. The recording system R includes a semiconductor laser beam source 5 (capable of emitting a laser beam having a wave length of 8300 Å) which can be energized to a high output level and which is capable of modulating the intensity of the laser beam by a modulation signal, an optical system 7 for focusing the laser beam and irradiating a laser beam spot having a predetermined diameter on the recording layer 2 of the recording medium D, a semi-transparent mirror 6, a focusing system and a tracking servo system 8. Whereas, the reproduction system P includes a semiconductor laser beam source 9 (capable of emitting a laser beam having a wave length of 8300 Å) which can be continuously operated at a low output level (for example, at from 1 to 3 mw), an optical system 11 for focusing the laser beam and irradiating a laser beam spot having a predetermined diameter to the recording layer 2 of the recording medium D, a semi-transparent mirror 10, a photodetector (silicon PIN diode) for reading out the physical change created in the recording layer 2 of the recording medium D, a signal circuit, a focusing system and a tracking servo-system 12.

For instance, tin-lead alloys having various compositions within the range of from 20 to 75% by weight of tin and the rest being lead, were coated each on the surface of a plastic disc-shaped substrate 1 as a thin layer having a thickness of about 500 Å to obtain samples. The respective samples having tin-lead alloy thin layers having different compositions were rotated, and the recording of signals was conducted by intermittently irradiating the tin-lead alloy thin layers of the respective samples with a focused laser beam (a laser beam from a semiconductor laser having a wave length of from 8300 Å) having a diameter of about 1 μm, whereby the optical reflectance increased at the portions of the samples irradiated with the laser beam as compared to the portions not irradiated with the laser beam. Thus, in the above samples, the portions irradiated with the laser beam were clearly distinguished from the portions not irradiated with the laser beam by observation with the naked eye under room light. When observed by an optical microscope, the portions of the tin-lead alloy thin layers of the samples which underwent a phase transformation by the irradiation with the laser beam were clearly distinguished as a series of bright portions having clear contrast ratios, since such portions had higher reflectance than the other portions.

FIG. 2 shows recording dots [FIG. 2(b)] formed in the tin-lead alloy thin layer when the sample is rotated as mentioned above and irradiated with a laser beam intermittently on the time axis as shown in FIG. 2(a), and the reflectance [FIG. 2(c)] of the recording dot portions of the tin-lead alloy thin layer and of other portions.

When the tin-lead alloy thin layer having the partial phase transformation as mentioned above, was inspected by a scanning electron microscope, the recording dots were not observed at all. This indicates that the optical change such as a change in the reflectance of light formed in the tin-lead alloy thin layer by the irradiation of a laser beam spot, is not due to a formation of irregularities on the surface of the tin-lead alloy thin layer.

Then, the tin-lead alloy thin layer having the phase transformation caused by the irradiation of the laser beam spot as mentioned above, was subjected to the measurement of the oxygen amount and the nitrogen amount at the recorded portions and at the non-recorded portions by EPMA (Electron Probe Micro Analysis), whereby no difference was observed as between the recorded portions and the non-recorded portions. This indicates that the change in the reflectance or transmission of light or the change in the color tone formed in the tin-lead alloy thin layer by the irradiation with a laser beam spot as mentioned above, is not due to a chemical change in the substance at the recorded portions formed in the tin-lead alloy thin layer by the irradiation of the laser beam.

From the above test results, the change in the optical characteristics formed in the tin-lead alloy thin layer by the irradiation of the laser beam spot, is believed to be caused by a change in the arrangement of atoms in the material constituting the tin-lead alloy thin layer by the thermal energy imparted to the tin-lead alloy thin layer by the irradiation of the laser beam so that the optical characteristics of the tin-lead alloy thin layer vary as between the recorded portions and the non-recorded portions.

FIG. 3(a) is a graph showing the change in the laser beam sensitivity (i.e. the laser beam intensity sufficient to cause the phase transformation of the recording medium, whereby the secondary harmonic distortion in the reproduced signal from the portions of the recording medium irradiated with the laser beam of that intensity, is minimized) of the tin-lead alloy thin layer relative to the change in the tin content (% by weight) in the tin-lead alloy. Likewise, FIG. 3(b) is a graph showing the change in the C/N ratio (i.e. the carrier wave/noise ratio) of the reproduced signal relative to the change in the tin content (% by weight) in the tin-lead alloy. The results of the measurements shown in FIGS. 3(a) and (b) were obtained under the following conditions.

Namely, a recording medium D (having no protective layer on the recording layer) comprising a disc-shaped synthetic resin substrate (a disc-shaped acrylic resin substrate) and a thin layer of a tin-lead alloy composed essentially of from 20 to 75% by weight of tin and the rest being lead and having a thickness of about 500 Å, coated on the surface of the substrate, was secured at its center to a rotary shaft and rotated at a speed of 900 rpm, and the position at a radius of 50 mm from the center of the information recording disc was irradiated with a spot of a diameter of about 1 $\mu$m of a laser beam having a wave length of 8300 Å and with its intensity modulated by repeating rectangular wave signals with a frequency of 500 KHz, whereby the rectangular wave signals of 500 KHz were recorded on the tin-lead alloy thin layer by the phase transformation. The tests for the results shown in FIGS. 3(a) and (b) were conducted by using a number of recording media D having different tin contents within a range of from 20 to 75% by weight of tin, as the recording medium D comprising the substrate and a thin layer of a tin-lead alloy composed essentially of from 20 to 75% by weight of tin and the rest being lead and having a thickness of about 500 Å, coated on the substrate.

From the characteristics of the change in the laser beam sensitivity of the tin-lead alloy thin layer relative to the change in the tin content (% by weight) in the tin-lead alloy as shown in FIG. 3(a), it is evident that the laser beam sensitivity of the tin-lead alloy thin layer is substantially constant over a wide range of from 30 to 70% by weight of the tin content in the tin-lead alloy.

Thus, the laser beam sensitivity of the tin-lead alloy thin layer is maintained substantially constant even if the tin content is varied within such a wide range as from 30 to 70% by weight (i.e. the laser beam sensitivity is substantially constant over a wide range of from 30 to 70% by weight of tin). This means that the allowance in the fluctuations in the proportions of the components constituting the recording layer for the production of the recording media is wide, and the mass production of recording media will be easier.

Further, since the allowance in the fluctuations of the proportions of the constituting components for the recording layer for the production of the recording media is wide as mentioned above, the production of information recording discs by continuous in-line sputtering can readily be conducted by using a tin-lead alloy prepared by melting and solidifying tin and lead, as the target. Further, needless to say, the recording of information on the tin-lead alloy recording layer may be conducted by a method of raising the temperature of the recording layer other than the method where the temperature is raised by means of the laser beam spot.

Further, in the recording medium D wherein the tin-lead alloy thin layer is used as the recording layer, the C/N ratio of the reproduction signal can be maintained at a high level over a wide range of the tin content (% by weight) in the tin-lead alloy i.e. as wide as from 30 to 70% by weight of tin, as shown in FIG. 3(b). An alloy recording medium having such a characteristic can not be obtained from the conventional recording media. According to the recording medium in which the tin-lead alloy for recording media of the present invention is used for the recording layer, the reproduction of signals can readily be conducted under excellent S/N.

If the recording layer is thicker than 1000 Å, the power required for recording tends to increase. On the other hand, if it is thinner than 100 Å, the C/N ratio tends to decrease.

The practical thickness of the recording layer is suitably selected within a range of from 100 to 1000 Å taking the recording power and the C/N ratio into consideration.

Now, the second aspect of the present invention i.e. a tin-copper alloy for recording media consisting essentially of from 40 to 60 atomic % of tin and the rest being copper, will be described.

An alloy comprising tin and copper has been known as bronze from olden times. Usual bronze is a copper-tin alloy containing from 4 to 12% by weight of tin, i.e. an $\alpha$ or $\alpha+\gamma$ solid solution of copper-tin alloy. A variety of bronzes having different compositions have been prepared depending upon the particular purposes such as bronze coins, art works such as bronze statues, or gun metal, bell metal or bronze for industrial material useful for machine parts, or else. However, in any case, such bronze used for various purposes is a copper-tin alloy composed essentially of about 10% by weight of tin and about 90% by weight of copper.

In the copper-tin alloy, if it is attempted to increase the tin content, segregation is likely to be obtained and the resulting alloy tends to be brittle. This may be the main reason why the bronze which has been widely used from olden times has a composition of about 10% by weight of tin and about 90% by weight of copper as mentioned above.

The tin-copper alloy for recording media of the present invention has been developed on the basis of the discovery during the research on the recording materials suitable for recording media of phase transformation type (i.e. the thermal transformation type wherein the light transmission, reflectance, absorption or the like is changed by the thermal energy) that a tin-copper alloy composed essentially of from 40 to 60 atomic % of tin and the rest being copper, has characteristics particularly suitable for the recording media of phase transformation type.

Now, the tin-copper, alloy for recording media of the present invention will be described in detail with reference to the drawings.

FIG. 4 is a perspective view showing the construction of a recording layer-forming apparatus, whereby a thin layer recording medium of a tin-copper alloy composed essentially of from 40 to 60 atomic % of tin and the rest being copper is formed on a substrate surface. In FIG. 4, reference numeral 13 designates a substrate, on the surface of which the tin-copper alloy for recording media is formed. As such a substrate 13, a glass disc, an acrylic resin disc or a disc made of other suitable material may be employed.

Reference numeral 14 is a rotary shaft for rotating the substrate 13 at a high speed. This rotary shaft 14 is rotated at a predetermined rotational speed by a rotational driving means (such as a motor) not shown.

Reference numerals 15 and 16 designate vessels containing evaporation materials, respectively. Numerals 17 and 18 designates heating coils for heating the boats 15 and 16, respectively. The vessel 15 and the heating coil 17 constitute one evaporating source A. Likewise, the vessel 16 and the heating coil 18 constitute the other evaporating source B. The evaporating source A heats and evaporates tin contained in the vessel 15. Likewise, the evaporating source B heats and evaporates copper contained in the vessel 16.

Reference numeral 19 is a shutter plate which may be inserted between the above substrate 13 and the evaporating sources A and B. The entire assembly of the above-mentioned parts is accommodated in a container not shown, and the following layer-forming operation is applied to the substrate 13 in a vacuum atmosphere created in the container.

Namely, the substrate 13 is secured to the rotary shaft 14. Tin as a evaporation material is placed in the vessel 15 of the evaporating source A. Likewise, copper as another evaporation material is placed in the vessel 16 of the other evaporating source B. Then, the container is evacuated to form a vacuum atmosphere having a desired vacuum level in the container.

Then, the shutter plate 19 is inserted between the substrate 13 and the evaporating sources A and B, and the substrate 13 is rotated at a predetermined high speed. Further, a predetermined heating voltage is applied to the heating coils 17 and 18 of the evaporating sources A and B, respectively, to melt the tin and copper contained in the vessels 15 and 16, respectively.

The temperature of tin contained in the vessel 15 of the evaporating source A, the temperature of copper contained in the vessel 16 of the evaporating source B and the rotational speed of the substrate 13, are controlled to form a tin-copper alloy thin layer having a predetermined composition, i.e. a tin-copper alloy thin layer composed essentially of from 40 to 60 atomic % of tin and the rest being copper.

The time for the vacuum deposition of the evaporation material to the surface of the substrate 13 is determined so that the tin-copper alloy thin layer composed essentially of from 40 to 60 atomic % of tin and the rest being copper is formed on the surface of the substrate 13 in a predetermined thickness e.g. from 500 to 1000 Å. The control for opening or closing the shutter plate 19 is conducted accordingly.

After the formation of a recording layer in which the tin-copper alloy composed essentially of from 40 to 60 atomic % of tin and the rest being copper is deposited on the surface of the substrate 13 as a recording layer having a predetermined thickness, the rotation of the substrate 13 is stopped, and the atmospheric air is admitted into the container, and then the substrate 13 having a recording layer formed on the surface, is withdrawn from the container.

When it is necessary to form a protective layer on the surface of the recording layer formed on the surface of the substrate 13, a protective layer of a suitable synthetic resin thin film may be coated on the surface of the recording layer. The above-mentioned coating of a protective layer of a synthetic resin thin film, may be conducted also by evaporating a suitable synthetic resin material from a evaporating source not shown. As the method for forming a recording layer as a thin layer having a predetermined thickness made of a tin-copper alloy composed essentially of from 40 to 60 atomic % of tin and the rest being copper, on the surface of the substrate 13, it is of course possible to employ sputtering or any other suitable layer-forming method other than the above-mentioned two component vapor deposition method. When sputtering is used as the layer-forming method for the substrate 13, it is possible to form, as a recording layer, a thin layer of a tin-copper alloy composed essentially of from 40 to 60 atomic % of tin and the rest being copper and having a predetermined thickness, on the surface of the substrate 13 by properly adjusting the rotational speed of the substrate 13, the energy of the ions (such as argon ions) bombarded on a copper target, the energy of ions (such as argon ions) bombarded on a tin target and the period of time for sputtering. Further, the layer-forming operation by sputtering may be conducted by using a single target of a tin-copper alloy with its composition adjusted taking the sputtering rates of tin and copper into consideration.

Figure 5:
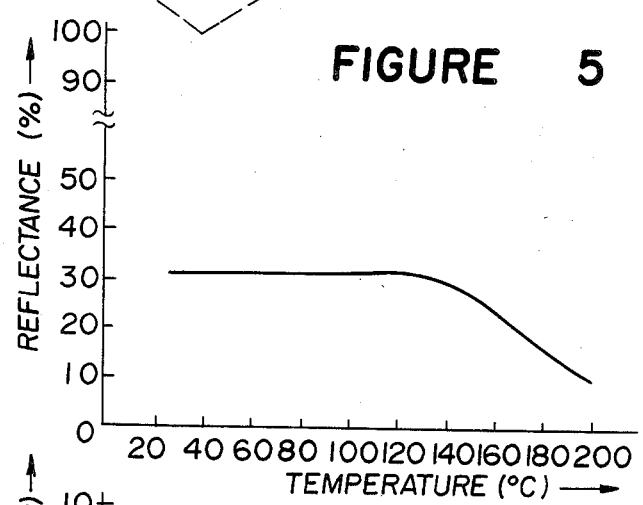
FIG. 5 is a graph showing the relation between the temperature of the tin-copper alloy thin layer for recording media and the reflectance of light.

FIG. 5 is a graph showing the results of the measurement of the change in the reflectance of light of a thin layer of a tin-copper alloy formed by coating a tin-copper alloy composed essentially of 53 atomic % of tin and the rest being copper on the surface of a glass substrate as a thin layer having a thickness of 500 Å when the temperature of the tin-copper alloy thin layer is changed from room temperature to 200° C. while irradiating the tin-copper alloy thin layer with a He-Ne laser beam (wave length: 6328 Å) at an incident angle of 45°. As is evident from FIG. 5, the reflectance of light of the thin layer of the tin-copper alloy composed essentially of 53 atomic % of tin and the rest being copper, distinctly changes at a temperature of the tin-copper alloy thin layer of 120° C. or higher (likewise, the change in the transmission of light is distinct at a temperature of the tin-copper alloy thin layer of 120° C. or higher). Further, it has been confirmed by visual observation that the color tone of the tin-copper alloy thin layer also changes in correspondence with the change of the temperature.

When a thin layer of a tin-copper alloy coated on the surface of a synthetic resin substrate (an acrylic resin substrate), being a thin layer of a tin-copper alloy composed essentially of 53 atomic % of tin and the rest being copper and having a thickness of 500 Å, was irradiated with a laser beam spot having a diameter of about 1 μm with a wave length of 8300 Å to induce a phase transformation in the thin layer of the tin-copper alloy, there appeared changes in the reflectance and transmission of light and a change in the color tone which was distinctly observed by the naked eye under room light, in the thin layer of the tin-copper alloy.

Whereas, when the tin-copper alloy thin layer having the partial phase transformation as mentioned above, was inspected by a scanning electron microscope, no recording dots were observed. This indicates that the changes in the reflectance and transmission and the change in the color tone created in the tin-copper alloy thin layer by the irradiation of a laser beam spot, is not due to a formation of irregularities on the surface of the tin-copper alloy thin layer.

However, the recording dots due to the phase transformation in the tin-copper alloy thin layer was clearly observed as a series of dark portions having clear contrast-ratios by an optical microscope.

From the above test results, the changes in the reflectance and transmission of light and the change in the color tone created in the thin layer of the tin-copper alloy by the irradiation of the laser beam spot, are believed to be caused by a change in the arrangement of atoms in the material constituting the tin-copper alloy thin layer by the thermal energy imparted to the tin-copper alloy thin layer by the irradiation of the laser beam so that the optical characteristics of the tin-copper alloy thin layer vary as between the recorded portions and the non-recorded portions.

Figure 6:
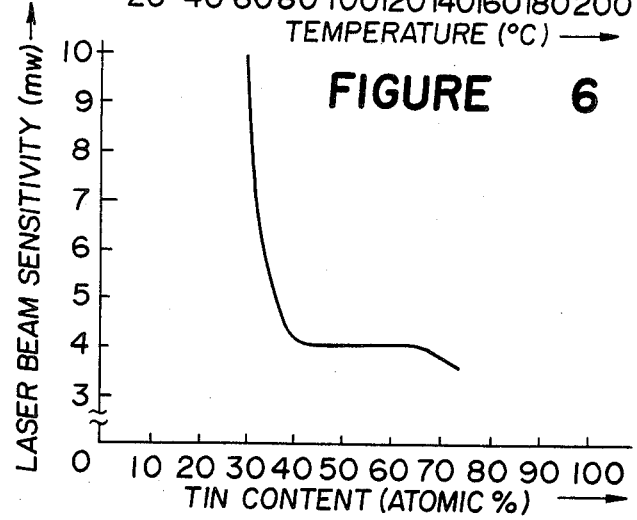
FIG. 6 is a graph showing the relation between the tin content in the tin-copper alloy thin layer and the laser beam sensitivity.

FIG. 6 is a graph showing the change in the laser beam sensitivity (i.e. the laser beam intensity sufficient to cause the phase transformation of the recording medium, whereby the secondary harmonic distortion in the reproduced signal from the portions of the recording medium irradiated with the laser beam of that intensity, is minimized) of the tin-copper alloy thin layer relative to the change in the tin-content (atomic %) in the tin-copper alloy. The results of the measurement shown in FIG. 6 were obtained under the following conditions.

Namely, a disc of information recording medium comprising a disc-shaped synthetic resin substrate (a disc-shaped acrylic resin substrate) and a thin layer of a tin-copper alloy composed essentially of from 30 to 75 atomic % of tin and the rest being copper and having a thickness of about 500 Å, coated on the surface of the substrate, was secured at its center to a rotary shaft and rotated at a speed of 900 rpm, and the position at a radius of 50 mm from the center of the information recording disc was irradiated with a spot of a diameter of about 1 μm of a laser beam having a wave length of 8300 Å and with its intensity modulated by signals with a frequency of 500 KHz, whereby the signals of 500 KHz were recorded on the tin-copper alloy thin layer by the phase transformation. The tests for the results shown in FIG. 6 were conducted by using a number of information recording medium discs having different tin contents within a range of from 30 to 75 atomic % of tin, as the information recording disc comprising the substrate and a thin layer of a tin-copper alloy composed essentially of from 30 to 75 atomic % of tin and the rest being copper and having a thickness of about 500 Å, coated on the substrate.

From the characteristics of the change in the laser beam sensitivity of the tin-copper alloy thin layer relative to the change in the tin content (atomic %) in the tin-copper alloy as shown in FIG. 6, it is evident that the laser beam sensitivity of the tin-copper alloy thin layer is substantially constant over a wide range of from 40 to 60 atomic % of the tin content in the tin-copper alloy.

Within the above range of the tin content, the S/N ratio of reproduced signals is constant at a level of 55 dB.

If the recording layer is thicker than 1000 Å, the power required for recording tends to increase. On the other hand, if it is thinner than 100 Å, the C/N ratio tends to decrease.

The practical thickness of the recording layer is suitably selected within a range of from 100 to 1000 Å taking the recording power and the C/N ratio into consideration.

The laser beam sensitivity of the tin-copper alloy thin layer is maintained substantially constant even if the tin content is varied within such a wide range as from 40 to 60 atomic % (i.e. the laser beam sensitivity is substantially constant over a wide range of from 40 to 60 atomic % of tin). This means that the allowance in the fluctuations in the proportions of the components constituting the recording layer for the production of the recording media is wide, and the mass production of recording media will be easier.

Further, since the allowance in the fluctuations of the proportions of the constituting components for the recording layer for the production of the recording media is quite wide as mentioned above, the production of information recording medium discs by continuous in-line sputtering can readily be conducted by using a tin-copper alloy prepared by melting and solidifying tin and copper, as the target.

As is evident from the foregoing detailed description, according to the tin-lead alloy and the tin-copper alloy of the present invention, the laser beam sensitivity of the thin layer made thereof can be maintained substantially constant even if the tin content varies within a wide range such as from 30 to 70% by weight of tin in the case of the tin-lead alloy or from 40 to 60 atomic % in the case of the tin and copper alloy (i.e. the laser beam sensitivity can be maintained substantially constant over such a wide range of the tin content). Such a characteristic has not been obtained by the conventional phase transformation-recording media of chalcogenite type or lower oxide type. The recording media in which the tin alloys for recording media of the present invention are used, can be produced by mass production more readily than the conventional phase transformation type recording media.

What is claimed is:

1. A recorded medium capable of use in a recording and reproducing apparatus in which the medium is irradiated by a laser light beam, said recorded medium comprising a recorded layer consisting of an alloy selected from the group consisting of tin-lead and tin-copper, said recorded layer having information recorded thereon in the form of relatively high reflectance regions and relatively low reflections regions, said high reflectance regions being the product of irradiation of said alloy with a laser beam to produce physical phase transformation of said alloy whereas said low reflectance regions are non-irradiated portions of the alloy, said tin-lead alloy consisting of 30 to 70% by weight of tin, the rest being lead, said tin-copper alloy consisting of 40 to 60 atomic % of tin, the rest being copper.

2. A recording medium used in recording and/or reproducing apparatus in which the medium is irradiated by a laser light beam to cause erasing, recording and/or reproducing of information on the recording medium, said medium comprising a recording layer consisting of tin-lead alloy of a thickness and composition to undergo physical phase transformation causing change in light reflectance of said alloy due to application of thermal energy by irradiation with a laser light beam of determined intensity, said alloy consisting essentially of 30 to 70% by weight of tin, the rest being lead.

3. A recording medium as claimed in claim 2 wherein said alloy has substantially uniform sensitivity to phase transformation upon irradiation by the light beam of determined intensity over the entire range of the weight percentage of tin.

4. A recording medium as claimed in claim 2 wherein said recording layer is formed by a layer-forming technique.

5. A recording medium as claimed in claim 2 wherein said recording layer is formed by two-component vapor deposition.

6. A recording medium as claimed in claim 2 wherein said recording layer is formed by sputtering.

7. A recording medium as claimed in claim 2 comprising a transparent substrate on which said alloy is formed.

8. A recording medium as claimed in claim 7 wherein said recording layer has a thickness of from 100 to 1000 Å.

9. A recording medium as claimed in claim 7 wherein said recording layer has a thickness of from 500 to 1000 Å.

10. A recording medium as claimed in claim 2 wherein the physical phase transformation of the tin-lead alloy irradiated by said laser light beam produces a series of bright portions with clear contrast ratios due to higher reflectance than the remaining non-irradiated portions of the alloy without the formation of irregularities on the surface of the layer or chemical change of the alloy.

11. A recording medium as claimed in claim 10 wherein said alloy provides a substantially uniform C/N ratio of the reproduced signal over substantially the entire range of the contents of the tin-lead alloy, wherein C/N represents the carrier wave/noise ratio of the reproduced signal.

12. A recording medium as claimed in claim 11 wherein said alloy provides a substantially uniform C/N ratio of the reproduced signal over substantially the entie range of the contents of the tin-copper alloy, wherein C/N represents the carrier wave/noise ratio of the reproduced signal.

13. A recording medium used in recording and/or reproducing apparatus in which the medium is irradiated by a light beam to cause erasing, recording and reproducing of information on the recording medium, said medium comprising a recording layer consisting of tin-copper alloy of a thickness and composition to undergo physical phase transformation causing change in light reflectance of said alloy due to application of thermal energy by irradiation with a laser light beam of determined intensity, said alloy consisting essentially of 40 to 60 atomic % of tin, the rest being copper.

14. A recording medium as claimed in claim 13 wherien said alloy has substantially uniform sensitivity to phase transformation upon irradiation by the light beam of determined intensity over the entire range of the weight percentage of tin.

15. A recording medium as claimed in claim 13 wherein said recording layer is formed by a layer-forming technique.

16. A recording medium as claimed in claim 13 wherein said recording layer is formed by two-component vapor deposition.

17. A recording medium as claimed in claim 13 wherein said recording layer is formed by sputtering.

18. A recording medium as claimed in claim 13 wherein the physical phase transformation of the tin-copper alloy irradiated by said laser light beam produces a series of bright portions with clear contrast ratios due to higher reflectance than the remaining non-irradiated portions of the alloy without the formation of irregularities on the surface of the layer or chemical change of the alloy.

19. A recording medium as claimed in claim 13 comprising a transparent substrate on which said alloy is formed.

20. A recording medium as claimed in claim 19 wherein said recording layer has a thickness of from 100 to 1000 Å.

* * * * *